(12) United States Patent
Ohnishi

(10) Patent No.: US 9,310,469 B2
(45) Date of Patent: Apr. 12, 2016

(54) RADAR PERFORMANCE MONITOR, PULSE-COMPRESSION RADAR APPARATUS, AND RADAR PERFORMANCE MEASURING METHOD

(71) Applicant: Furuno Electric Co., Ltd., Nishinomiya (JP)

(72) Inventor: Yoshifumi Ohnishi, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 324 days.

(21) Appl. No.: 13/971,785

(22) Filed: Aug. 20, 2013

(65) Prior Publication Data

US 2014/0300507 A1 Oct. 9, 2014

(30) Foreign Application Priority Data

Aug. 27, 2012 (JP) ................................. 2012-186624

(51) Int. Cl.
| | |
|---|---|
| *G01S 7/40* | (2006.01) |
| *G01S 7/28* | (2006.01) |
| *G01S 13/28* | (2006.01) |
| *G01S 7/12* | (2006.01) |

(52) U.S. Cl.
CPC ................. *G01S 7/4004* (2013.01); *G01S 7/28* (2013.01); *G01S 7/40* (2013.01); *G01S 13/28* (2013.01); *G01S 7/12* (2013.01)

(58) Field of Classification Search
CPC . G01S 7/40; G01S 7/4052; G01S 2007/4095; G01S 7/4021
USPC .................................. 342/129–131, 165–174
See application file for complete search history.

(56) References Cited

U.S. PATENT DOCUMENTS

| | | | | |
|---|---|---|---|---|
| 4,145,692 A | * | 3/1979 | Armstrong | ................. G01S 7/22 342/173 |
| 5,262,787 A | * | 11/1993 | Wilson | ................... G01S 7/4052 342/172 |
| 5,457,463 A | * | 10/1995 | Vencel | .................. G01S 7/4052 342/169 |
| 6,075,480 A | * | 6/2000 | Deliberis, Jr. | ......... G01S 7/4052 342/169 |
| 6,777,684 B1 | * | 8/2004 | Volkov | ............... G01N 21/3581 250/341.1 |
| 7,688,257 B1 | * | 3/2010 | Christianson | ........... G01S 13/30 342/131 |

FOREIGN PATENT DOCUMENTS

| | | |
|---|---|---|
| JP | S62201382 A | 9/1987 |
| JP | H08338867 A | 12/1996 |
| JP | 2000195000 A | 7/2000 |
| JP | 2008009846 A | 1/2008 |
| JP | 2011043351 A | 3/2011 |
| JP | 2011175512 A | 9/2011 |

\* cited by examiner

*Primary Examiner* — John B Sotomayor
*Assistant Examiner* — Marcus Windrich
(74) *Attorney, Agent, or Firm* — Alleman Hall McCoy Russell & Tuttle LLP

(57) ABSTRACT

A radar performance monitor is provided. The monitor includes a receiver for receiving a transmission signal of which a temporal change of a frequency is non-linear, the transmission signal being transmitted from a radar unit of a pulse-compression radar apparatus, and a response signal generator for generating a response signal of which a temporal change of a frequency is linear and transmitting the response signal to the radar unit as a response to the transmission signal received by the receiver.

9 Claims, 8 Drawing Sheets

RADAR PERFORMANCE MONITOR, PULSE-COMPRESSION RADAR APPARATUS, AND RADAR PERFORMANCE MEASURING METHOD

CROSS-REFERENCE TO RELATED APPLICATION(S)

The application claims priority under 35 U.S.C. §119 to Japanese Patent Application No. 2012-186624, which was filed on Aug. 27, 2012, the entire disclosure of which is hereby incorporated by reference.

TECHNICAL FIELD

The present invention generally relates to a radar performance monitor, specifically, a radar performance monitor attached to a radar apparatus for transmitting a signal of which a temporal change of a frequency is not linear.

BACKGROUND OF THE INVENTION

Oscillators and demodulators provided to radar apparatuses may deteriorate as being used, and be damaged due to intense signals from outside. Therefore, there have been cases where a radar performance monitor is provided to such a radar apparatus so as to check whether a transmission power and a reception sensitivity of the radar apparatus are sufficient.

A radar performance monitor receives a transmission signal transmitted by the radar unit of the radar apparatus, and transmits a response signal to the radar unit. The response signal is analyzed and the result thereof is used for, for example, confirming the performance of the radar apparatus. JP2011-043351A discloses such kind of radar performance monitor.

The radar performance monitor disclosed in JP2011-043351A transmits, as a response signal, a signal of which a frequency continuously changes within a predetermined frequency range including a reception band of the radar unit (so-called chirp signal). With this configuration, a transmission band of the response signal is prevented from being out of the reception band of the radar unit even when the frequency of the response signal is changed, for example.

Meanwhile, in recent years, pulse-compression radar apparatuses have been known, which have configurations of transmitting, as a transmission signal, a signal of which a pulse length is comparatively long and a frequency continuously changes, and performing a pulse compression when the signal is received. As the transmission signal of the pulse-compression radar apparatus, not only a signal of which a frequency changes linearly (linear signal), but also a signal of which a frequency changes non-linearly (non-linear signal) may be used.

Here, with the conventional radar performance monitors provided to pulse-compression radar apparatuses where a non-linear signal is transmitted therefrom, it has been thought that a response signal similar to a transmission signal needs to be transmitted because in a case where a non-linear transmission signal is transmitted, if a frequency of the transmission signal varies from that of the response signal, a signal of which a peak is dropped (or with no peak) will be detected even if the radar unit performs a pulse compression.

Therefore, the radar performance monitors have been required to include a configuration for generating the non-linear transmission signal (e.g., a D/A converter or a mixer). Moreover, the radar performance monitors have been required to receive a reference signal from the radar unit to match the frequency of the transmission signal with that of the response signal. As described above, the radar performance monitors provided to the pulse-compression radar apparatuses where the non-linear signal is transmitted therefrom have the extremely complicated configurations.

SUMMARY OF THE INVENTION

The present invention is made in view of the above situation, and generally aims to provide a radar performance monitor that can appropriately check the performance of a radar unit for transmitting a non-linear signal without requiring a configuration for generating the non-linear transmission signal or a reference signal from the radar unit.

According to one aspect of the present invention, a radar performance monitor with the following configuration is provided. The radar performance monitor includes a receiver for receiving a transmission signal of which a temporal change of a frequency is non-linear, the transmission signal being transmitted from a radar unit of a pulse-compression radar apparatus, and a response signal generator for generating a response signal of which a temporal change of a frequency is linear and transmitting the response signal to the radar unit as a response to the transmission signal received by the receiver.

Thus, even when the linear response signal is transmitted while the transmission signal is non-linear, a peak portion of the response signal can be detected. Therefore, the configuration of the radar performance monitor can be simplified while appropriately exerting the function of checking the performance of the radar unit.

The response signal generator may generate the response signal so that a slope of the linear response signal matches with a part of the non-linear transmission signal.

Thus, even when the frequency of the transmission signal or the response signal is changed due to time lapse, the function as the radar performance monitor can be exerted without changing the signal transmitted from the response signal generator.

A waveform of the transmission signal may be symmetric with respect to a point corresponding to a center frequency of the transmission signal. The part of the non-linear transmission signal may correspond to the center frequency of the transmission signal.

Thus, the effect that the response signal does not need to follow the change in frequency of the transmission signal or the response signal can be achieved with the pulse-compression radar apparatus, by using the transmission signal having a waveform which is normally used.

The response signal generator may be able to change the temporal change rate of the frequency of the response signal.

Thus, even when the transmission signal transmitted from the radar unit is switched or the radar performance monitor is attached to a different radar apparatus, the radar performance monitor can be applied to such cases.

The response signal generator may include a phase synchronization circuit having a frequency sweep function for changing the frequency of the response signal.

Thus, the signal of which the frequency change is linear can be generated by a simple control.

According to another aspect of the present invention, a pulse-compression radar apparatus is provided. The apparatus includes the radar performance monitor of any of the aspects described above, and a radar unit for transmitting the transmission signal, receiving the response signal, and performing a pulse compression on the response signal based on the transmission signal.

Thus, the pulse-compression radar apparatus including the radar performance monitor with the simple configuration can be realized.

According to further another aspect of the present invention, a method of measuring a radar performance is provided. The method includes transmitting a transmission signal of which a temporal change of a frequency is non-linear, from a radar unit of a pulse-compression radar apparatus, receiving the transmission signal by a radar performance monitor of the pulse-compression radar apparatus, transmitting a response signal of which a temporal change of a frequency is linear, from the radar performance monitor to the radar unit as a response to the transmission signal, and performing a pulse compression on the response signal based on the transmission signal.

Thus, even when the linear response signal is transmitted while the transmission signal is non-linear, a peak portion of the response signal can be detected. Therefore, the configuration of the radar performance monitor can be simplified while appropriately exerting the function of checking the performance of the radar unit.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Figure 1:
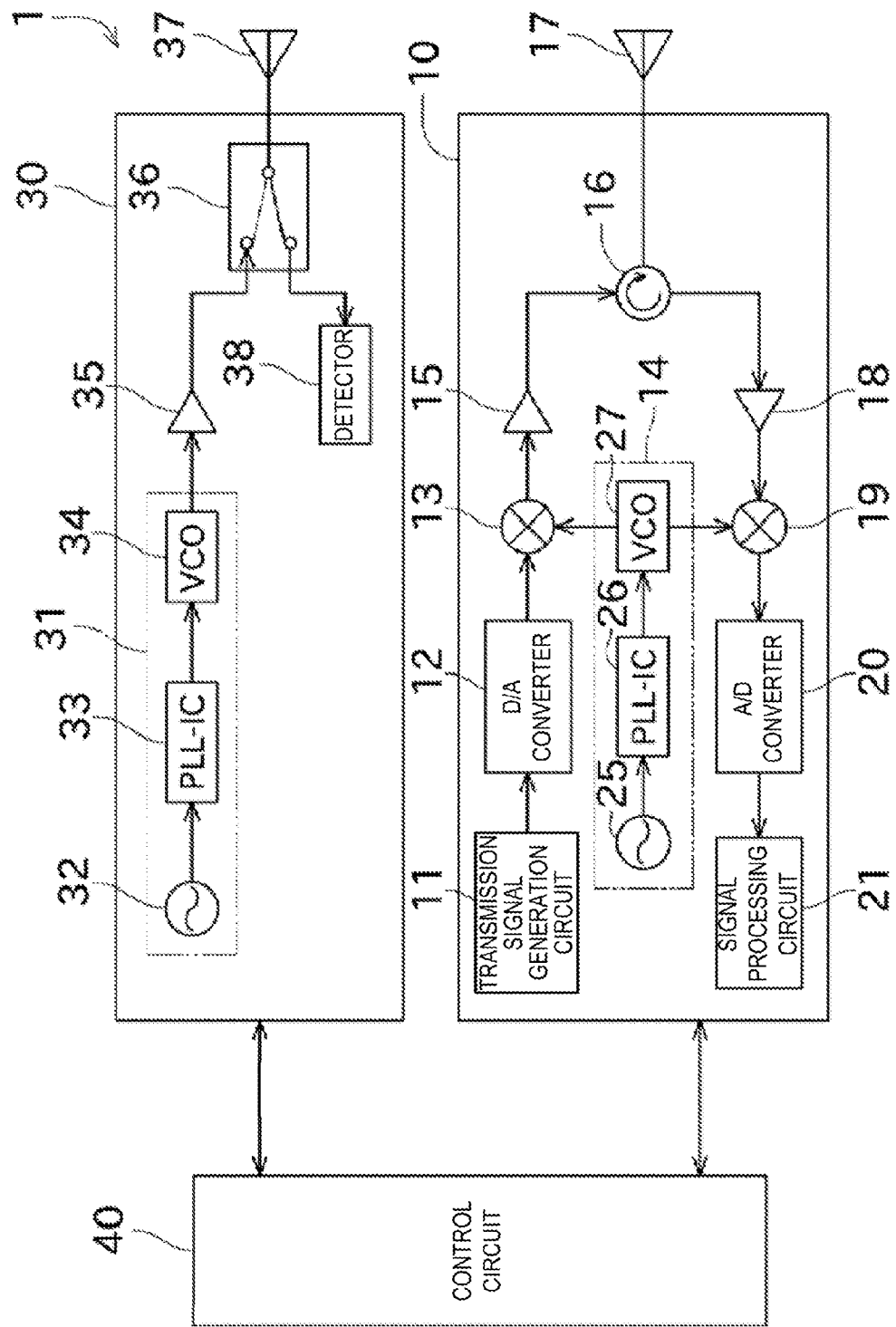
FIG. 1 is a block diagram showing a configuration of a pulse-compression radar apparatus according to one embodiment of the invention.

Next, embodiments of the present invention are described in detail with reference to the accompanying drawings. FIG. 1 is a block diagram showing a configuration of a pulse-compression radar apparatus 1 according to one embodiment of the present invention.

The pulse-compression radar apparatus 1 of this embodiment is a radar apparatus equipped in a ship (hereinafter, it may be referred to as "the ship concerned" or may be simply referred to as "the ship") and can detect a position and a speed of a target object by transmitting a radio wave (transmission signal) having a long pulse length, and performing a pulse compression on and analyzing a reception signal that is the transmission signal reflected on the target object. Moreover, the pulse-compression radar apparatus 1 includes a radar unit 10 for transceiving radio waves, a PM unit 30 (radar performance monitor) for checking the performance of the radar unit 10, and a control circuit 40.

The radar unit 10 includes, as a configuration for transmitting the transmission signal, a transmission signal generation circuit 11, a D/A converter 12, a mixer 13, a local oscillator 14, a transmission amplifier 15, a circulator 16, and a radar antenna 17.

The transmission signal generation circuit 11 generates a transmission signal having a predetermined waveform (a temporal change of a frequency). In this embodiment, the transmission signal generation circuit 11 generates a non-linear transmission signal (non-linear chirp signal) and outputs it to the D/A converter 12. The D/A converter 12 converts the transmission signal generated by the transmission signal generation circuit 11, from a digital signal into an analog signal, and outputs it to the mixer 13.

The local oscillator 14 includes an oscillator 25, a PLL (phase synchronization circuit)-IC 26, and a VCO (Voltage Control Oscillator) 27.

The oscillator 25 can generate a signal having a predetermined frequency. The PLL-IC 26 controls the VCO 27 to output a local oscillator signal (station transmission signal) therefrom.

The mixer 13 mixes the transmission signal inputted from the D/A converter 12 with the station transmission signal outputted from the local oscillator 14. In this manner, the frequency of the transmission signal can be increased to a transmission frequency. The mixer 13 outputs the transmission signal with the increased frequency to the transmission amplifier 15. The transmission amplifier 15 amplifies the transmission signal and transmits it outside from the radar antenna 17 via the circulator 16. The transmission signal is the non-linear chirp signal as described above (see R*(t) of FIG. 3).

The radar antenna 17 transmits the transmission signal as described above and receives a reflection signal obtained by the transmission signal reflecting on a target object (echo source), as a reception signal. Moreover, the radar antenna 17 repeats the transception of the radio wave while rotating in a horizontal plane at a predetermined rotational speed. With the above configuration, scanning is performed over 360° in the horizontal plane centering the ship, and the state of the target object existing around the ship can be acquired.

The circulator 16 can suitably switch a path of the signal so that the high-energy transmission signal from the transmission amplifier 15 is not inputted into the circuit on the reception side but the reception signal is appropriately inputted into the circuit on the reception side.

Next, the configuration of processing the reception signal received by the radar antenna 17 is described. The radar unit 10 includes, as a configuration for processing the reception signal, a reception amplifier 18, the mixer 19, and an A/D converter 20, and a signal processing circuit 21.

The reception amplifier 18 performs processing of amplifying the reception signal having a weak level. By passing through the reception amplifier 18, the weak reception signal level can be amplified to the level where the following processing can be performed. The amplified reception signal is outputted to the mixer 19.

The mixer 19 can reduce the frequency of the reception signal by mixing the reception signal with the station transmission signal of the local oscillator 14 similarly to the mixer 13. The mixer 19 outputs the reception signal of which the frequency is reduced, to the A/D converter 20. The A/D converter 20 converts the reception signal of which the frequency is reduced, from an analog signal into a digital signal.

Figure 2:
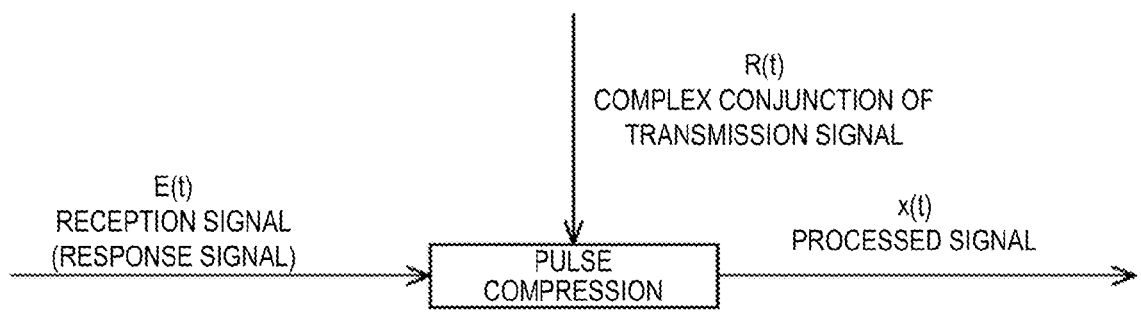
FIG. 2 is a view illustrating a pulse compression.

The signal processing circuit 21 performs a pulse-compression on the reception signal inputted from the A/D converter 20 with the consideration of the transmission signal, etc. The pulse-compression is, as shown in FIG. 2, processing of obtaining a processed signal by compressing (demodulating) a signal pulse based on the reception signal and a complex conjugation of the transmission signal. The signal processing circuit 21 creates a radar image based on the processed signal.

Specifically, the signal processing circuit 21 obtains a distance from the radar antenna 17 to the target object based on a time difference between a timing at which the radar antenna 17 transmits the transmission signal and a timing at which the radar antenna 17 receives the reflection signal. Moreover, the signal processing circuit 21 acquires a direction of the target object based on the direction of the radar antenna 17 when the signal is detected. As described above, the signal processing circuit 21 creates the radar image and displays it on a display unit (not illustrated).

Next, the description is given about the PM unit 30. The PM unit 30 includes a response signal generator 31, a response amplifier 35, a switch 36, a PM antenna 37, and a detector (receiver) 38.

The response signal generator 31 includes, as a configuration for generating the response signal, an oscillator 32, a PLL-IC 33, and a VCO 34.

The oscillator 32 can generate a signal with a predetermined frequency. The PLL-IC 33 controls the VCO 34 to output the response signal therefrom. In this embodiment, the response signal outputted from the VCO 34 is a linear signal of which a frequency changes as time lapses and the frequency change amount is fixed (linear chirp signal) (see E(t) of FIG. 3).

Note that, in this embodiment, while the radar unit 10 has the configuration for transmitting the non-linear signal, the PM unit 30 has the configuration for transmitting the linear signal. Despite this, the performance of the radar unit 10 can be appropriately detected (the reason is described later).

Moreover, the PLL-IC 33 has a frequency sweep function which can change the frequency of the signal outputted therefrom. Therefore, the PLL-IC 33 can easily generate the signal of which the frequency changes as time lapses. The response signal generator 31 outputs to the response amplifier 35 the linear response signal generated by the response signal generator 31.

The response amplifier 35 amplifies the response signal and outputs it to the switch 36. The switch 36 can switch between a state where the response signal is transmitted to the PM antenna 37 and a state where the signal received by the PM antenna 37 (transmission signal transmitted from the radar unit 10) is outputted to the detector 38.

The switch 36 is normally in the state where the signal received by the PM antenna 37 is outputted to the detector 38. Thus, when the detector 38 detects that the transmission signal of the radar unit 10 is received by the PM unit 30, the PM unit 30 switches the state of the switch 36 to the state where the response signal is transmitted to the PM antenna 37 so as to transmit the response signal to the radar unit 10 (radar antenna 17).

Figure 4:
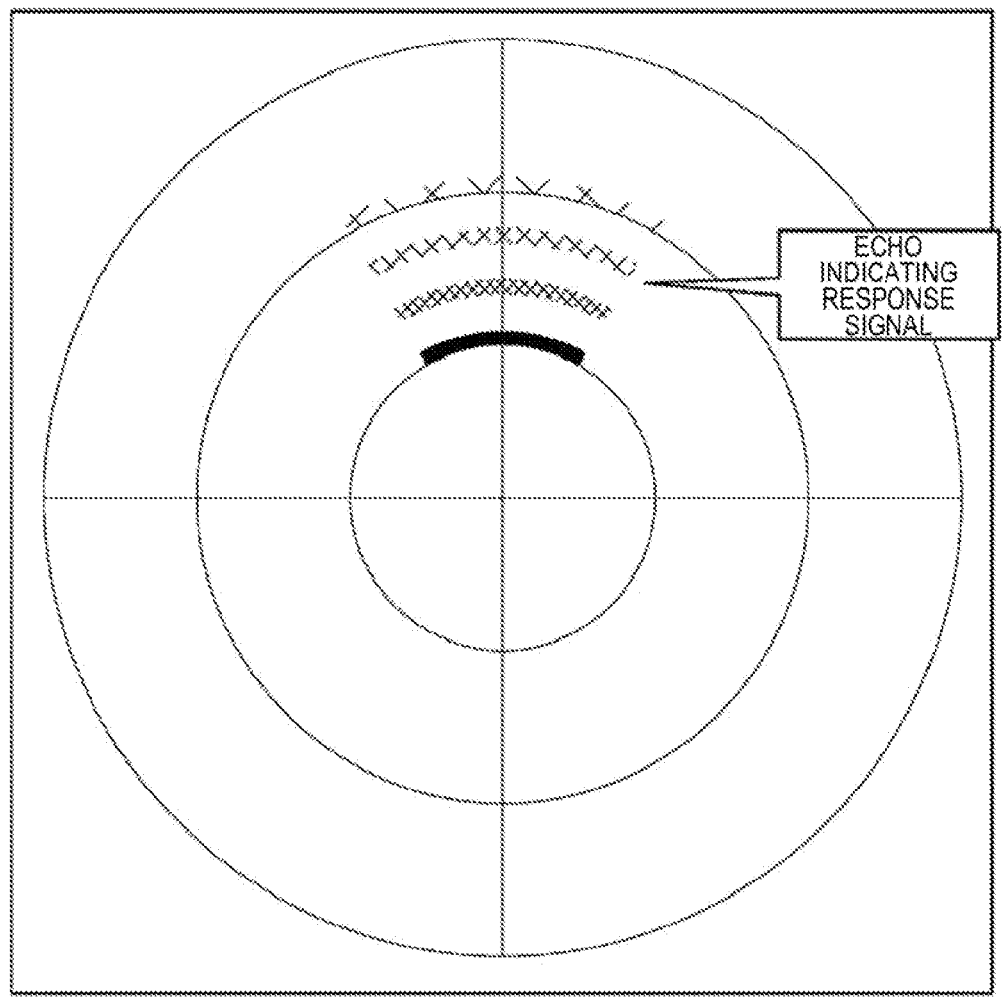
FIG. 4 shows one example of displaying a radar image of the response signal.

The radar unit 10 receives the response signal and performs, for example, a pulse compression to create the radar image. A user can check the performance of the radar unit 10 by checking the radar image. FIG. 4 shows one example of the radar image of the response signal. In this embodiment, the PM unit 30 transmits the response signal for a plurality of times while decreasing a signal intensity so that the response signal transmitted later has a lower intensity. According to this configuration, a reception sensitivity of the radar unit 10 can be checked based on the number of displayed echoes of the response signals. Note that, a transmission power of the radar unit 10 can be checked by the PM unit 30 changing a transmission timing of the response signal according to the intensity of the transmission signal.

Next, the description is given about the configuration of this embodiment and a conventional configuration while comparing therebetween.

Figure 8:
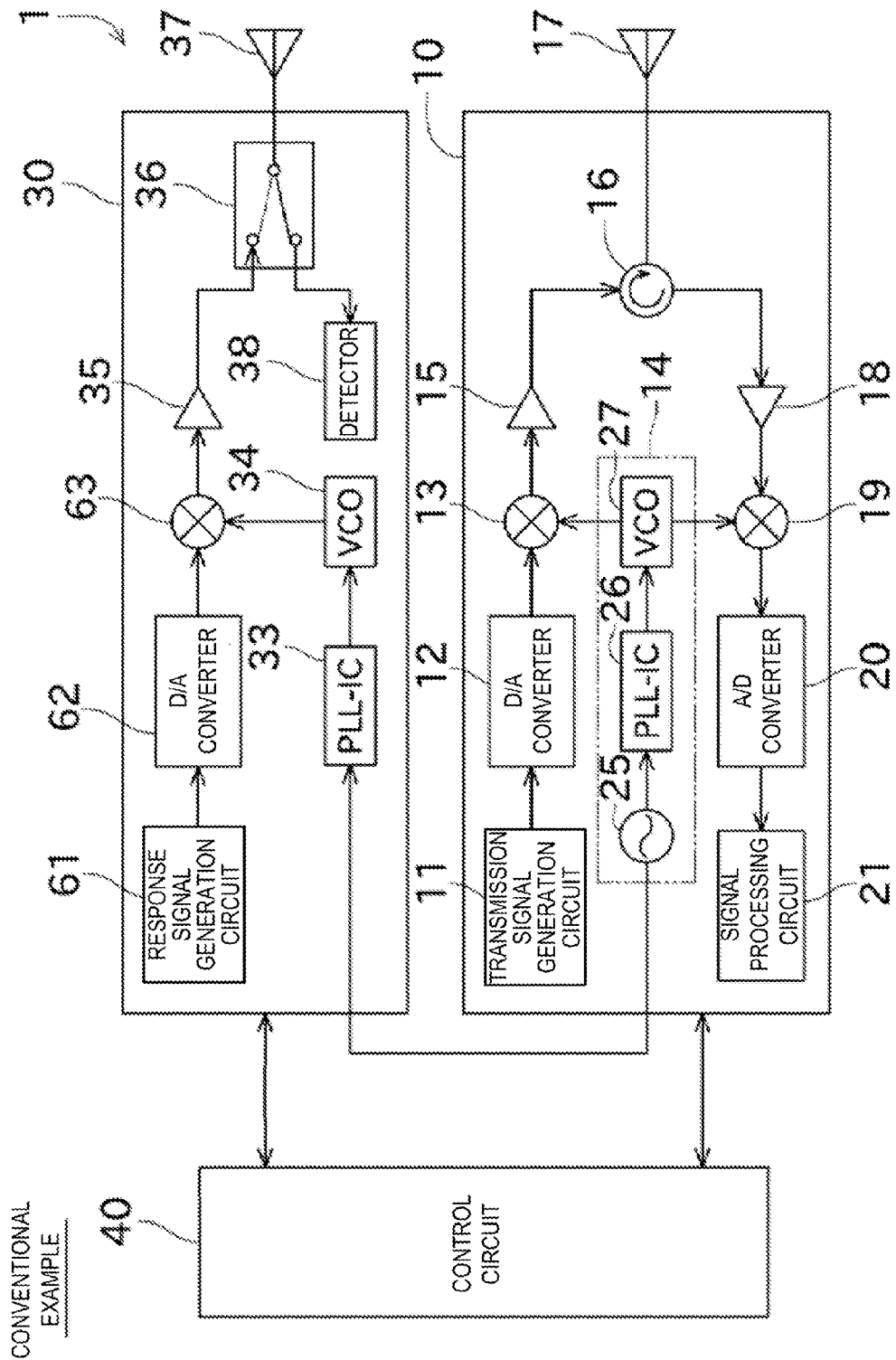
FIG. 8 is a block diagram showing a conventional pulse-compression radar apparatus.

Firstly, a simple description is given about a conventional pulse-compression radar apparatus 1. A conventional PM unit 30 includes, as shown in FIG. 8, a response signal generation circuit 61, a D/A converter 62, and a mixer 63 in addition to the configuration of the PM unit 30 of this embodiment. Additionally, the conventional pulse-compression radar apparatus 1 is formed with a circuit connecting the local oscillator 14 of the radar unit 10 with the PLL-IC 33.

The response signal generation circuit 61 can generate the non-linear response signal similarly to the transmission signal generation circuit 11. The D/A converter 62 converts the response signal from a digital signal into an analog signal. The mixer 63 increases the frequency of the response signal based on, for example, the local signal outputted from the local oscillator 14.

As described above, the conventional configuration requires a device for generating a complicated response signal. Moreover, the conventional PM unit 30 requires a circuit for receiving the local signal from the radar unit 10 in order to match the frequency with radar unit 10.

By the configuration described above, the conventional pulse-compression radar apparatus 1 can transmit the response signal with the same frequency (same waveform) as the transmission signal. Therefore, by pulse-compressing the response signal as described above, a highly accurate processed signal can be obtained.

Figure 3:
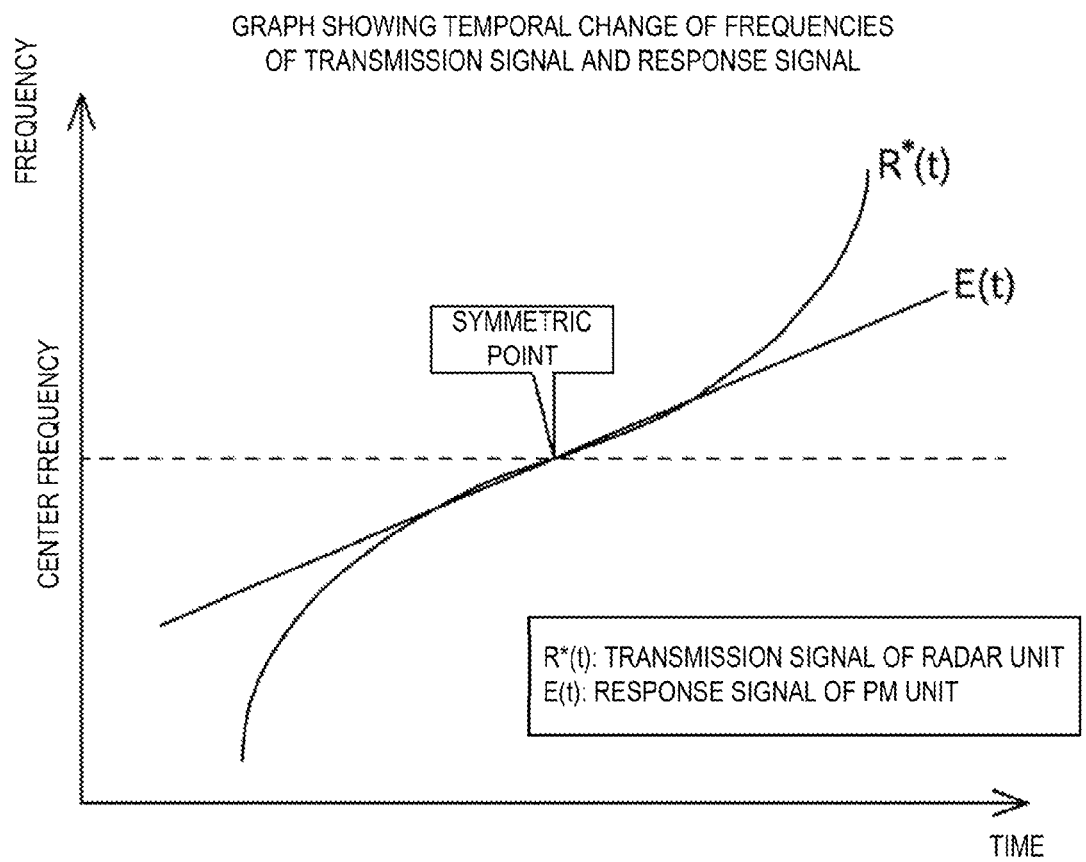
FIG. 3 is a chart showing a temporal change of frequencies of a transmission signal and a response signal.

Next, a detailed description is given about the waveforms of the transmission signal and the response signal of this embodiment. As shown in FIG. 3, the transmission signal (R*(t)) has a point symmetric waveform having a symmetric point indicating a center frequency, whereas, the response signal (E(t)) has a waveform set to cross the point indicating the center frequency of the transmission signal and have a slope which is the same as (extending along) the slope of the transmission signal indicating the center frequency. In other words, the response signal has a waveform near the center frequency of the transmission signal, approaching that of the transmission signal.

Figure 5:
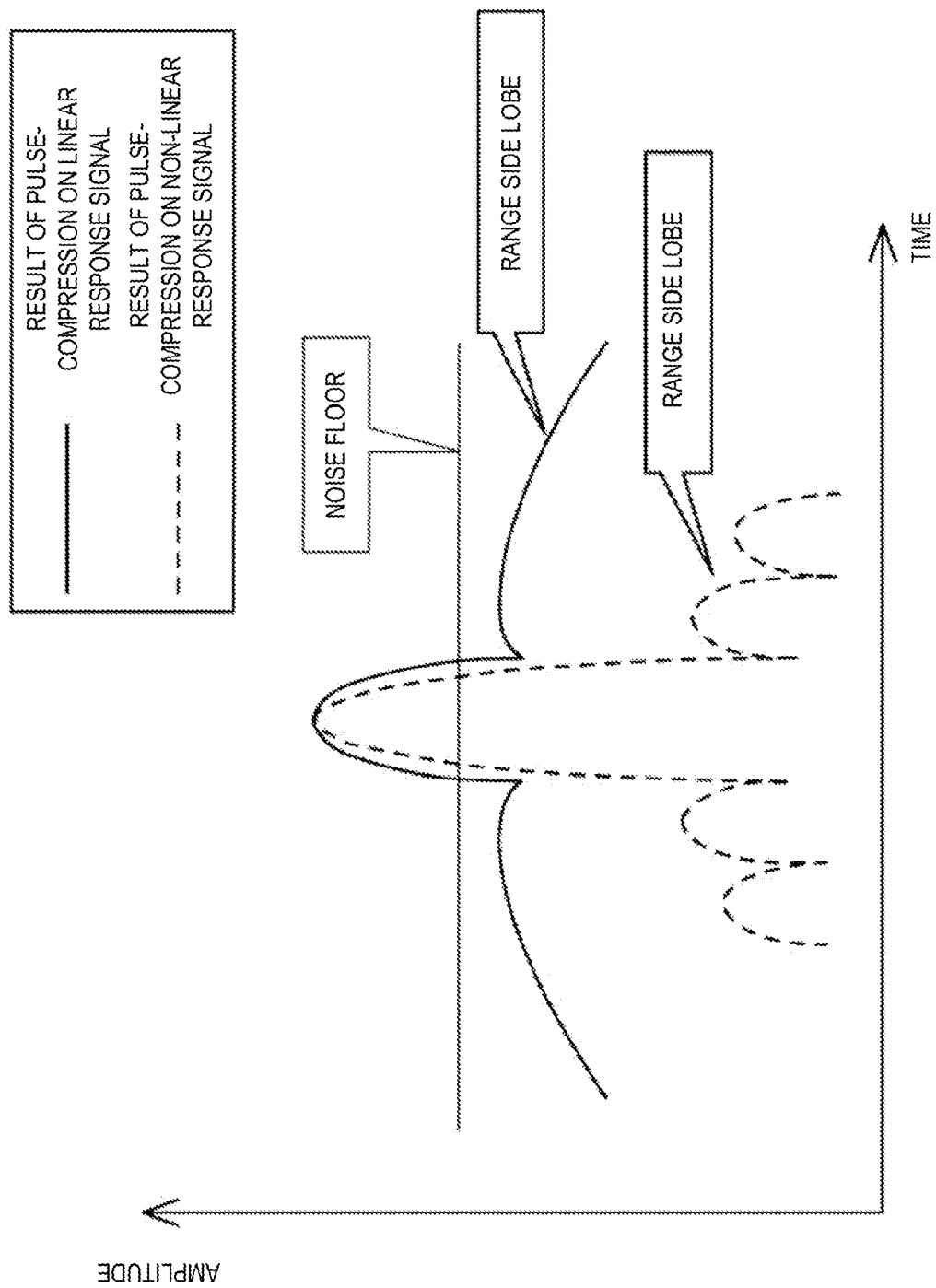
FIG. 5 is a chart showing a processed signal obtained by pulse-compressing linear and non-linear response signals.

Thus, by performing the pulse-compression on the response signal, the processed signal having a peak can be obtained (see the solid line of FIG. 5). As shown in FIG. 5, with the conventional configuration, the echo can be detected in higher accuracy than the configuration of this embodiment. However, with the radar performance monitor, since it is only necessary to know the position of the peak (i.e., only necessary for the position of the peak to be higher than the noise floor), the performance of the radar unit 10 can appropriately be checked even with the configuration of this embodiment.

Moreover, the configuration of this embodiment does not require the response signal generation circuit 61, the D/A converter 62, the mixer 63, and the circuit connecting the local oscillator 14 with the PLL-IC 33 as the conventional configuration does.

Figure 6:
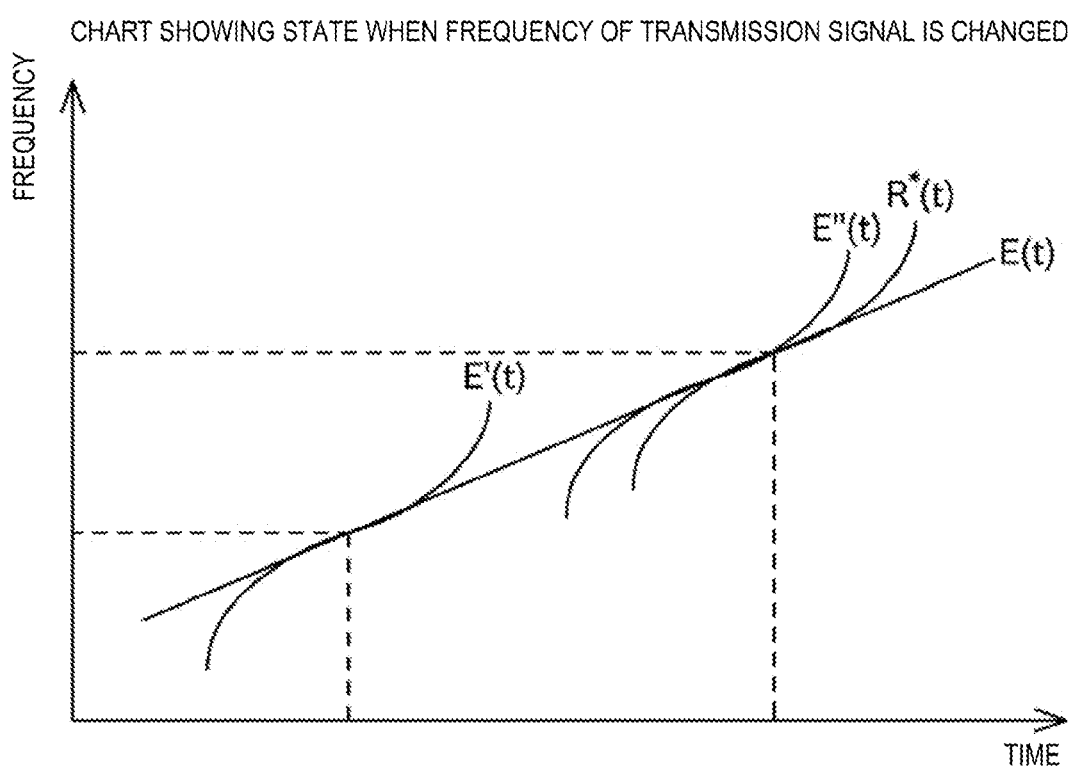
FIG. 6 is a chart showing a state when the frequencies of the transmission signal or the response signal is changed.

With the conventional configuration, the signal outputted by the local oscillator 14 (oscillator 25) is outputted to the PLL-IC 33. The frequency of the transmission signal may vary from that of the response signal according to a period of time of the crystal oscillator being used (chronological change property). In this case, as shown in FIG. 6, even though the varying amount between the transmission signal (R*(t)) and the response signal (E"(t)) is small, a significant distortion of the processed signal and a deterioration (disappearance) of the peak thereof may be concerned. Note that, with the crystal oscillator, the frequency of the signal may vary not only due to the time lapse but also due to the temperature change of the surroundings, for example.

Therefore, if the echo of the response signal is weakened (disappears), the cause thereof will be unclear whether it is caused because of the variation of the frequency of the transmission signal or the response signal, or because of the reception system of the radar unit 10. Thus, the performance of the radar unit 10 cannot be appropriately checked.

On the other hand, in this embodiment, as shown in FIG. 6, the direction in which the frequency of the transmission signal (R*(t)) transits (slope at the center frequency) is in match with the slope of the response signal (E(t)). Therefore, even when the frequency of the transmission signal varies, since the transmission signal will only transit following the response signal, the processed signal shows a similar shape thereto. In other words, with the configuration of this embodiment, the influence of the chronological change property of the oscillator and the like can be eliminated without performing a special synchronization.

As described above, the PM unit 30 of this embodiment includes the detector 38 and the response signal generator 31. The detector 38 receives the non-linear chirp signal as the transmission signal, the transmission signal being transmitted from the radar unit 10 of the pulse-compression radar apparatus 1. The response signal generator 31 generates the linear chirp signal as the response signal, and transmits the response signal to the radar unit 10 as a response to the transmission signal received by the detector 38.

In this manner, even when the linear response signal is transmitted while the transmission signal is non-linear, the peak portion of the response signal can be detected. Therefore, the configuration of the radar performance monitor can be simplified while appropriately exerting the function of checking the performance of the radar unit.

Although the suitable embodiment of the present invention is described above, the configuration may be modified as follows, for example.

Figure 7:
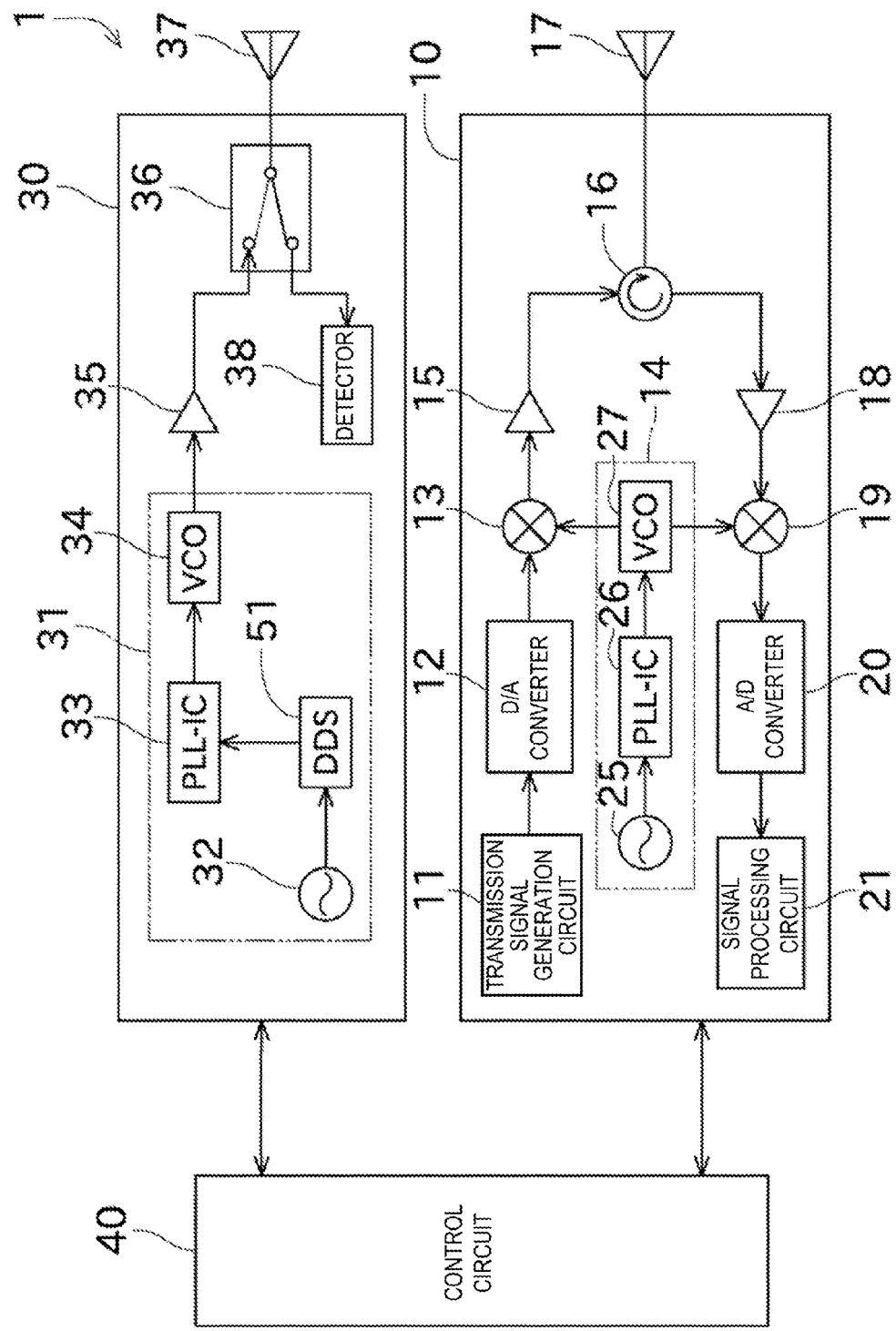
FIG. 7 is a block diagram showing a modified example of the pulse-compression radar apparatus.

The configuration of the response signal generator 31 is not limited to the example described above, and it may be configured to generate the response signal by using a DDS (Direct Digital Synthesizer) 51 as shown in FIG. 7.

Moreover, the PLL-IC 33 may not have the frequency sweep function. Additionally, the various oscillators are not necessarily be the crystal oscillator but may also be a different kind of atomic oscillator using, for example, rubidium, or may be a digital control oscillator (e.g., ring oscillator).

Furthermore, the response signal generator 31 is only necessary to generate the response signal such that the slope of the linear response signal matches with a part of the non-linear transmission signal, and the waveform generated by the transmission signal generation circuit 11 may not be the example described above.

The present invention is not limited to be the ship radar apparatus, but may also be a radar apparatus set in a lighthouse and for monitoring a position of a moving body and the like, and additionally, the configuration thereof may be such that it is equipped in a moving body other than a ship, for example, an aircraft or an automobile.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radar performance monitor, comprising:
   a receiver that receives a transmission signal of which a frequency changes non-linearly with time, the transmission signal being transmitted from a radar unit of a pulse-compression radar apparatus;
   a response signal generator that generates a response signal of which a frequency changes linearly with time and transmits the response signal to the radar unit as a response to the transmission signal received by the receiver.

2. The radar performance monitor of claim 1, wherein the response signal generator generates the response signal so that a slope of the linear response signal matches with a part of the non-linear transmission signal.

3. The radar performance monitor of claim 2, wherein a waveform of the transmission signal is symmetric with respect to a point corresponding to a center frequency of the transmission signal, and
   wherein the part of the non-linear transmission signal corresponds to the center frequency of the transmission signal.

4. The radar performance monitor of claim 1, wherein the response signal generator changes the temporal change rate of the frequency of the response signal.

5. The radar performance monitor of claim 1, wherein the response signal generator includes a phase synchronization circuit having a frequency sweep function for changing the frequency of the response signal.

6. A pulse-compression radar apparatus, comprising:
   radar performance monitor of claim 1; and
   a radar unit for transmitting the transmission signal, receiving the response signal, and performing a pulse compression on the response signal based on the transmission signal.

7. A method of measuring a radar performance, comprising:
   transmitting a transmission signal of which a frequency changes non-linearly with time, from a radar unit of a pulse-compression radar apparatus;
   receiving the transmission signal by a radar performance monitor of the pulse-compression radar apparatus;
   transmitting a response signal of which a frequency changes linearly with time, from the radar performance monitor to the radar unit as a response to the transmission signal; and
   performing a pulse compression on the response signal based on the transmission signal.

8. The radar performance measuring method of claim 7, wherein the transmitting the response signal includes transmitting the response signal to the radar unit so that a slope of the linear response signal matches with a part of the non-linear transmission signal.

9. The radar performance measuring method of claim 8, wherein a waveform of the transmission signal is symmetric with respect to a point corresponding to a center frequency of the transmission signal, and wherein the part of the non-linear transmission signal corresponds to the center frequency of the transmission signal.

* * * * *